US012798053B2

(12) United States Patent
Schmeichel et al.

(10) Patent No.: US 12,798,053 B2
(45) Date of Patent: Nov. 17, 2026

(54) TELESCOPING DEVICE FOR GRASPING AND RETRIEVING ITEMS

(71) Applicant: Bismarck Canvas, Inc., Menoken, ND (US)

(72) Inventors: Grant Patrick Schmeichel, Mandan, ND (US); Evan Anthony Schmeichel, Manda, ND (US); Jay Anthony Schmeichel, Bismarck, ND (US)

( * ) Notice: Subject to any disclaimer, the term of this patent is extended or adjusted under 35 U.S.C. 154(b) by 225 days.

(21) Appl. No.: 18/965,880

(22) Filed: Dec. 2, 2024

(65) Prior Publication Data

US 2026/0151876 A1 Jun. 4, 2026

(51) Int. Cl.
*B25B 9/00* (2006.01)

(52) U.S. Cl.
CPC ...................................... *B25B 9/00* (2013.01)

(58) Field of Classification Search
CPC ................ B25B 9/00; B25B 9/02; B25B 9/04
See application file for complete search history.

(56) References Cited

U.S. PATENT DOCUMENTS

| | | | |
|---|---|---|---|
| 867,961 A | 10/1907 | Fell | |
| 2,625,848 A | 1/1953 | Davies | |
| 4,307,909 A | 12/1981 | Yaworski | |
| 7,673,912 B2 | 3/2010 | Breininger | |
| 9,638,424 B2 | 5/2017 | Towner | |
| 10,315,304 B1 * | 6/2019 | Cowan | B25G 1/04 |
| 2010/0244474 A1 | 9/2010 | Kornely | |

FOREIGN PATENT DOCUMENTS

| | | |
|---|---|---|
| CH | 450318 A | 1/1968 |
| CN | 108127584 A | 6/2018 |
| CN | 213946437 U | 8/2021 |
| CN | 219700155 U | 9/2023 |
| CN | 117260661 A | 12/2023 |
| DE | 426137 C | 3/1926 |
| WO | WO 2017/156816 A1 | 9/2017 |

* cited by examiner

*Primary Examiner* — Sang K Kim
(74) *Attorney, Agent, or Firm* — Antoinette M. Tease

(57) ABSTRACT

A telescoping device for grasping and retrieving items with an outer tubular member and an inner tubular member that slides telescopically and rotates circumferentially within the outer tubular member and a gripping assembly that is disposed on a distal end of the telescoping device. The gripping assembly includes a top part that is fixedly attached to a top end of the inner tubular member and a bottom part that is fixedly attached to a top end of the outer tubular member and that has an aperture that is configured to receive the top end of the outer tubular member. A compression slot extends from the aperture in the bottom part and is parallel to the longitudinal axis of the bottom part. A hole in a side wall of the bottom part extends through the compression slot and is configured to receive a bolt.

8 Claims, 5 Drawing Sheets

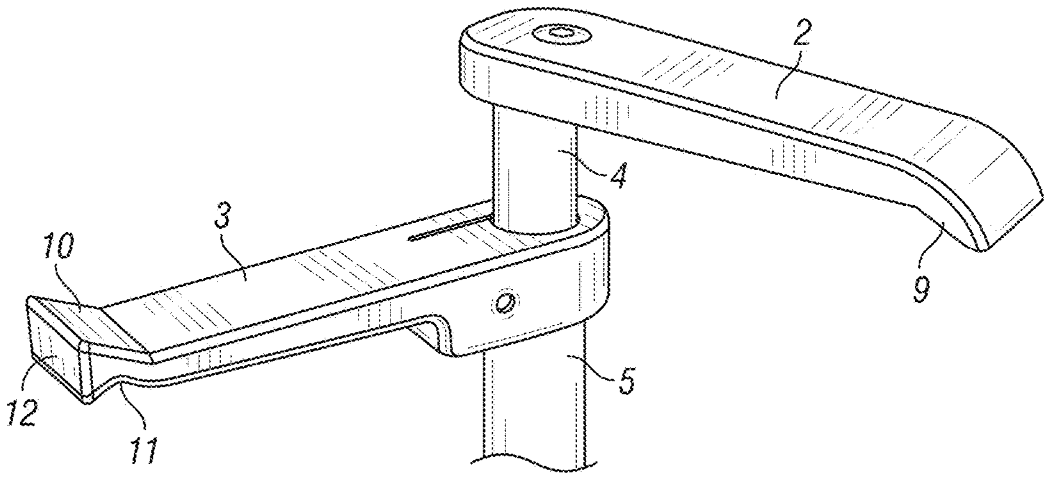
FIG. 3
FIG. 4
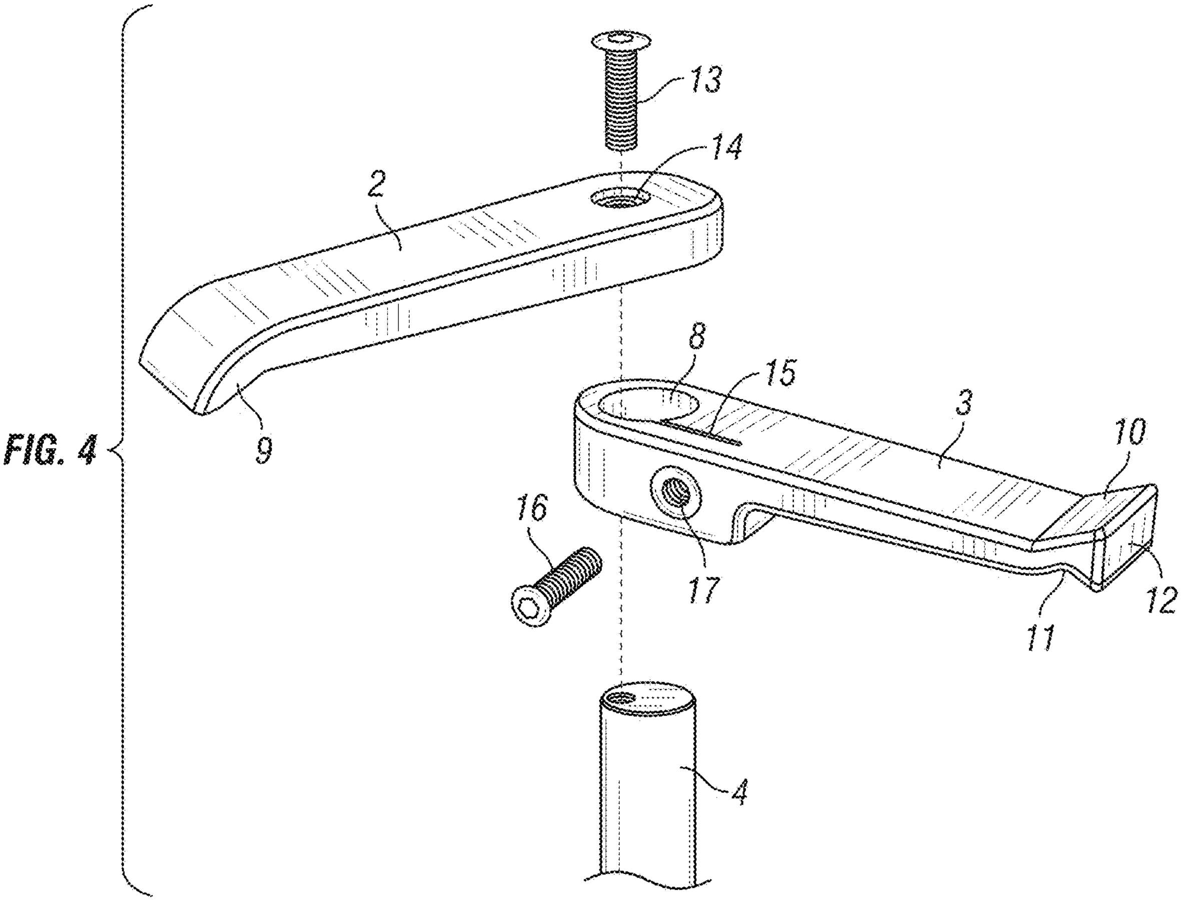

TELESCOPING DEVICE FOR GRASPING AND RETRIEVING ITEMS

BACKGROUND OF THE INVENTION

1. Field of the Invention

The present invention relates generally to the field of automotive accessories, and more particularly, to a telescoping device that is specifically designed to allow the user to grip and retrieve hard-to-reach items from the back of a pickup truck bed. The present invention is not limited to the automotive accessories field, however, and may be used in any situation in which it is desirable to retrieve an item that is not readily accessible.

2. Description of the Related Art

The present invention is intended to solve the problem of being unable to retrieve an item from the back of a pickup truck bed without climbing into the truck bed itself. The present invention is in the form of a telescoping tubular pole with a gripping assembly at the distal end of the pole. The gripping assembly is configured to grasp and hold an item for retrieval by the user. Discussed below are three inventions that are in the form of an elongated tube with a hook or prong. None of these inventions embodies the structural features or presents the functional advantages of the present invention, which are discussed more fully below in connection with the figures.

U.S. Pat. No. 4,307,090 (Yaworski, 1981) discloses a log-handling device with an elongated tubular member and a relatively longer member that extends through a passage in the tubular member, Each of these two members has a handle and a jaw, and the member are spring-loaded relative to each other in a manner that forces the jaws together. The user exerts manual force against the force of the spring to open the jaws. This device was intended primarily for use with handling logs.

U.S. Pat. No. 9,638,424 (Towner, 2017) provides an elongated gripping device, also intended for use in handling logs. The elongated gripping device has an elongated outer shaft with an extension shaft on one end of it. The extension shaft has one or more prongs extending from it. The elongated gripping device also has an elongated inner shaft that extends through the outer shaft. The inner shaft has a handle on one end and one or more prongs on the other end. The prongs on the inner shaft and the prongs on the extension shaft are opposing so that they form a claw-like structure, which is configured to grasp objects by rotating the handle on the inner shaft.

U.S. Patent Application Pub. No. 2010/0244474 (Kornely) describes a mechanical grasping devices that is intended for moving burning logs in a fireplace. The invention is comprised of a hollow tubular structure with a solid rod that runs inside the length of the hollow tubular member. A looped handle on one end of the rod is used to rotate the rod, and grasping prongs are situated on the other end of the rod and configured to lift and hold a log or burning ember.

BRIEF SUMMARY OF THE INVENTION

The present invention is telescoping device for grasping and retrieving items comprising: an outer tubular member; an inner tubular member that is configured to slide telescopically and to rotate circumferentially within the outer tubular member; and a gripping assembly that is disposed on a distal end of the telescoping device; wherein the gripping assembly comprises: a top part with a first end that is fixedly attached to a top end of the inner tubular member, and a bottom part with a first end that is fixedly attached to a top end of the outer tubular member; wherein the top part comprises a second end that is curved downward toward the bottom part; wherein the bottom part comprises a second end that comprises a ramp that angles upwardly toward the top part, an indentation that is situated directly underneath the ramp on a bottom surface of the bottom part, and a flat outward-facing surface that is situated between the ramp and the indentation, the flat outward-facing surface being perpendicular to the longitudinal axis of the bottom part and parallel to the longitudinal axis of the outer tubular member; wherein the bottom part further comprises an aperture that is configured to receive the top end of the outer tubular member; wherein the bottom part further comprises a compression slot that extends from the aperture in the bottom part and is parallel to the longitudinal axis of the bottom part; and wherein the bottom part further comprises a hole in a side wall of the bottom part, the hole extending through the compression slot and being configured to receive a bolt.

In a preferred embodiment, the top part of the gripping assembly and the bottom part of the gripping assembly are approximately equal in length and width. Preferably, the inner tubular member comprises a first handle situated at a bottom end of the inner tubular member, and the outer tubular member comprises a second handle situated at a bottom end of the outer tubular member. In another preferred embodiment, the inner tubular member has a longitudinal axis, the outer tubular member has a longitudinal axis, the top part of the gripping assembly has a longitudinal axis that is perpendicular to the longitudinal axis of the inner tubular member, and the bottom part of the gripping assembly has a longitudinal axis that is perpendicular to the longitudinal axis of the outer tubular member.

The aperture in the bottom part of the gripping assembly preferably comprises a lip around an inside circumference of the aperture, the lip being configured to abut up against the top end of the outer tubular member when the outer tubular member is inserted into the aperture. Preferably, the bottom part of the gripping assembly comprises a proximal section with a thickness, and the thickness of the proximal section is greater than the thickness of a remaining portion of the bottom part. In another preferred embodiment, the compression slot has a length, the proximal section has a length, and the length of the compression slot is approximately equal to the length of the proximal section of the bottom part of the gripping assembly.

In yet another preferred embodiment, the present invention is a telescoping device for grasping and retrieving items comprising: an outer tubular member; an inner tubular member that is configured to slide telescopically and to rotate circumferentially within the outer tubular member; and a gripping assembly that is disposed on a distal end of the telescoping device; wherein the gripping assembly comprises: a top part with a first end that is fixedly attached to a top end of the inner tubular member; and a bottom part with a first end that is fixedly attached to a top end of the outer tubular member; wherein the top part comprises a second end that is curved downward toward the bottom part; wherein the bottom part comprises an aperture that is configured to receive the top end of the outer tubular member; wherein the bottom part further comprises a compression slot that extends from the aperture in the bottom part and is parallel to the longitudinal axis of the bottom part; and wherein the bottom part further comprises a hole in a side wall of the bottom part, the hole extending through the compression slot and being configured to receive a bolt.

BRIEF DESCRIPTION OF THE DRAWINGS

FIG. 3 is a perspective view of the gripping assembly at the distal end of the present invention shown with the gripping assembly in a second position.

FIG. 4 is an exploded view of the gripping assembly of the present invention.

REFERENCE NUMBERS

Figure 1:
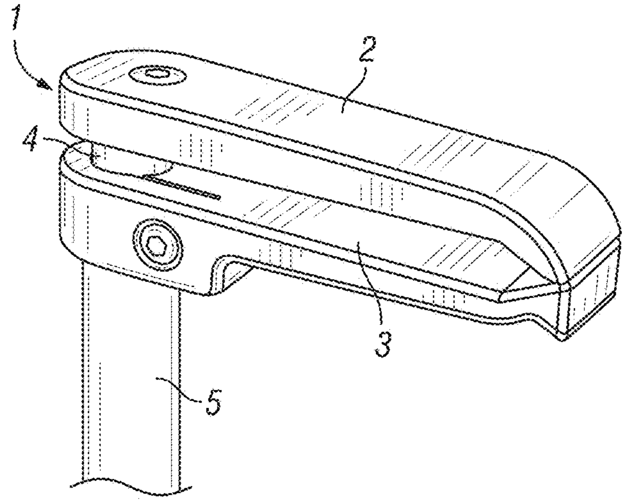
FIG. 1 is a perspective view of the gripping assembly at the distal end of the present invention shown with the gripping assembly in a first position.

1 Gripping assembly
2 Top part (of gripping assembly)
3 Bottom part (of gripping assembly)
4 Inner tubular member
5 Outer tubular member
6 Handle (on inner tubular member)
7 Handle (on outer tubular member)
8 Aperture (in bottom part of gripping assembly)
9 Second end (of top part of gripping assembly)
10 Ramp (on second end of bottom part of gripping assembly)
11 Indentation (on second end of bottom part of gripping assembly)
12 Flat outer surface (on second end of bottom part of gripping assembly)
13 First bolt
14 Hole (in top part of gripping assembly)
15 Compression slot (in bottom part of gripping assembly)
16 Second bolt
17 Hole (in bottom part of gripping assembly)
18 Lip
19 Proximal section (of bottom part of gripping assembly)

DETAILED DESCRIPTION OF INVENTION

FIG. 1 is a perspective view of the gripping assembly at the distal end of the present invention shown with the gripping assembly in a first position. As shown in this figure, the gripping assembly 1 is comprised of a top part 2 and a bottom part 3. The top and bottom parts of the gripping assembly are preferably equal in length and width, and they are configured to form a claw when positioned as shown in this figure. The top part of the gripping assembly is fixedly attached to the top of an inner tubular member 4, and the bottom part 3 of the gripping assembly is fixedly attached to the top of an outer tubular member 5. The inner tubular member 4 is configured to slide telescopically within the outer tubular member 5. When the inner tubular member 4 is slid upwardly within the outer tubular member 5, the "claw" opens, and the top part 2 and the bottom part 3 move away from each other (see FIG. 8).

Figure 2:
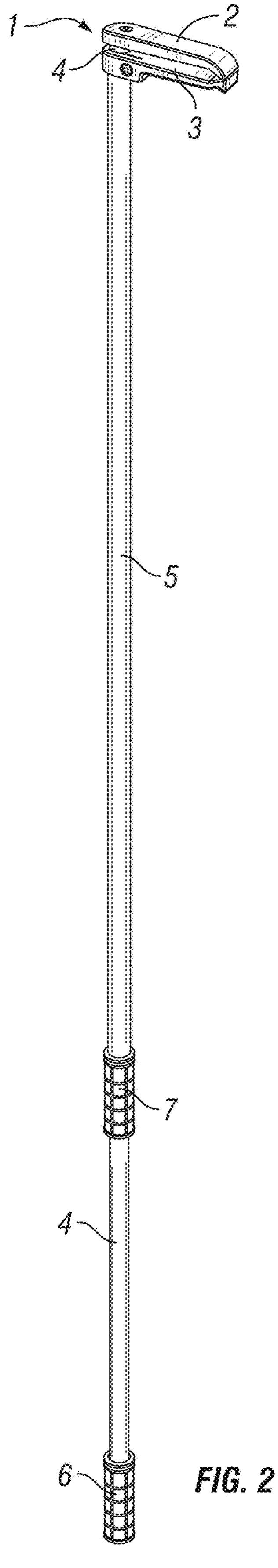
FIG. 2 is a perspective view of the present invention.

FIG. 2 is a perspective view of the present invention. As shown in this figure, the inner tubular member 4 comprises a handle 6 at the bottom of the inner tubular member. This handle 6 is used to slide the inner tubular member 4 up or down within the outer tubular member 5. The outer tubular member 5 preferably also comprises a handle 7 at the bottom end of the outer tubular member. The inner tubular member 4 not only slides up and down inside of the outer tubular member 5, but it also rotates (that is, twists from side to side) within the outer tubular member 5, as shown in FIG. 3. Accordingly, the outer diameter of the inner tubular member 2 is less than the inner diameter of the outer tubular member 5. For this reason, there is a slight gap between the outer circumference of the inner tubular member 4 and the perimeter of the aperture 8 in the bottom part of the gripping assembly (see FIG. 4). Note that the longitudinal axis of the top part 2 is perpendicular to the longitudinal axis of the inner tubular member 4, and the longitudinal axis of the bottom part 3 is perpendicular to the longitudinal axis of the outer tubular member 5.

FIG. 3 is a perspective view of the gripping assembly at the distal end of the present invention shown with the gripping assembly in a second position. In this figure, the inner tubular member 4 has been rotated relative to the outer tubular member 5 so that the top and bottom parts 2, 3 of the gripping assembly no longer form a claw. As shown in this figure, a first end of the top part 2 is fixedly attached to the top end of the inner tubular member. A second end 9 of the top part 2 is preferably curved downward, as shown, to facilitate grabbing an item with the top part. A first end of the bottom part 3 is fixedly attached to the top end of the outer tubular member 5. A second end of the bottom part 3 comprises a ramp 10 that angles upwardly (toward the top part 2). The bottom of the second end of the bottom part 3 preferably comprises an indentation 11 that is situated directly underneath the ramp 10. The second end of the bottom part 3 also comprises a flat outward-facing surface 12 (situated between the ramp 10 and the indentation 11) that can be used to manipulate or push against items. This surface 12 is perpendicular to longitudinal axis of the bottom part 3 and is parallel to the longitudinal axis of the outer tubular member 5.

FIG. 4 is an exploded view of the gripping assembly of the present invention. As shown in this figure, a first bolt 13 passes through a hole 14 in the top part 2 of the gripping assembly and secures the top part 2 to the inner tubular member 4. The bottom part 3 comprises a compression slot 15 that extends from the aperture 8 in the bottom part 3 along a line that is parallel to the longitudinal axis of the bottom part. A second bolt 16 passes through a hole 17 in the proximal section of the bottom part 3 that extends through the compression slot 15, thereby enabling this connection to be tightened (see also FIG. 1). Note that the hole 17 is perpendicular to the compression slot 15. The outer tubular member 5 is omitted from this figure.

Figure 5:
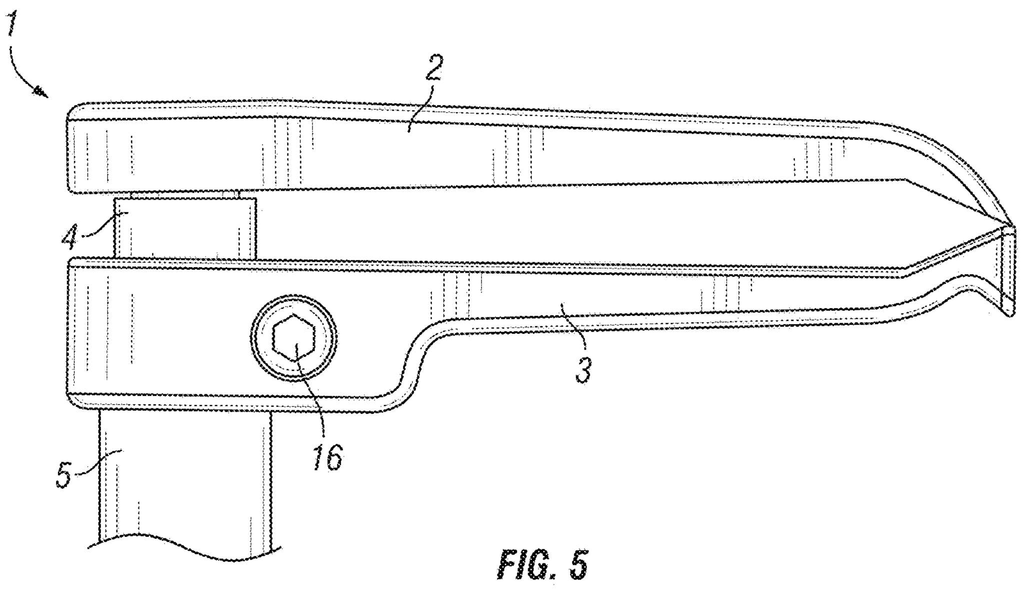
FIG. 5 is a side view of the gripping assembly of the present invention.

FIG. 5 is a side view of the gripping assembly of the present invention. As shown in this figure, the second bolt 16 preferably passes through the side of the bottom part 3 in front of the outer tubular member 5 and through the compression slot 15.

Figure 6:
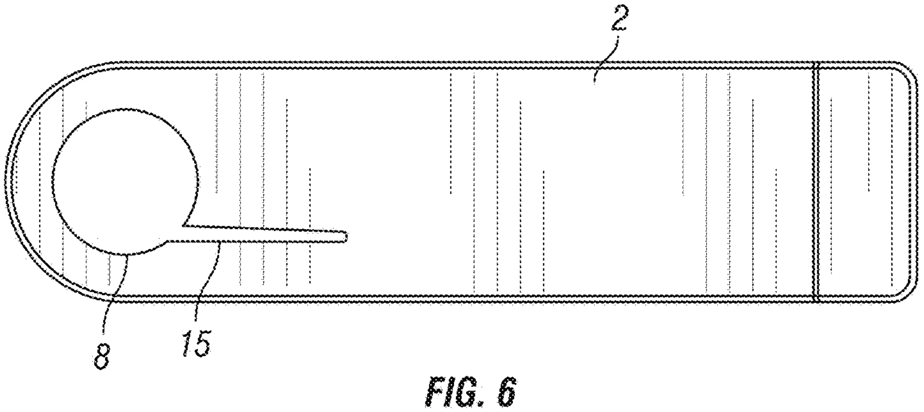
FIG. 6 is a top view of the bottom part of the gripping assembly of the present invention.
Figure 7:
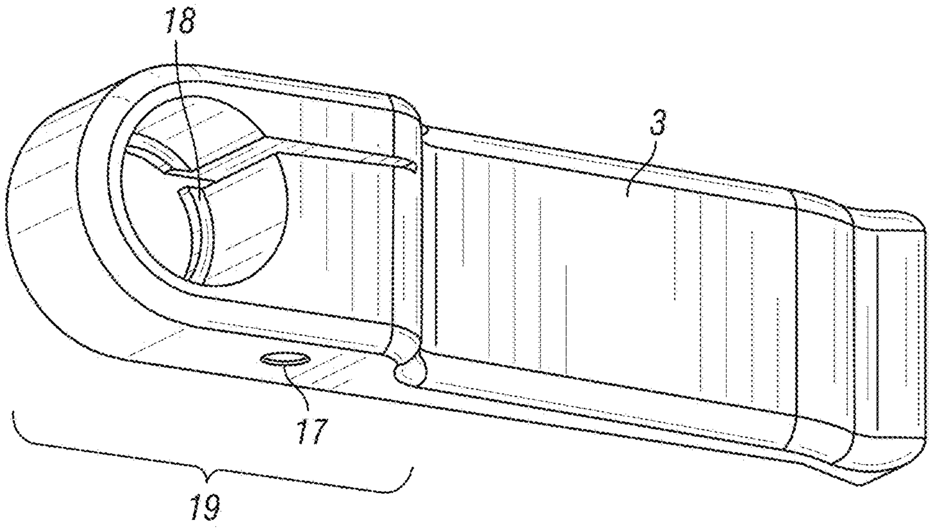
FIG. 7 is a bottom view of the bottom part of the gripping assembly of the present invention.

FIG. 6 is a top view of the bottom part of the gripping assembly of the present invention, and FIG. 7 is a bottom view of the bottom part of the gripping assembly of the present invention. As shown in these two figures, around the inside of the top circumference of the aperture 8 on the bottom part 3 is a lip 18. This lip 18 comes into contact with the top end of the outer tubular member 5 (not shown) and prevents it from moving further upward when the invention is fully installed. Note that the proximal section 19 of the bottom part 3 is thicker than the rest of the bottom part; this is to accommodate the hole 17 through which the second bolt 16 passes.

Figure 8:
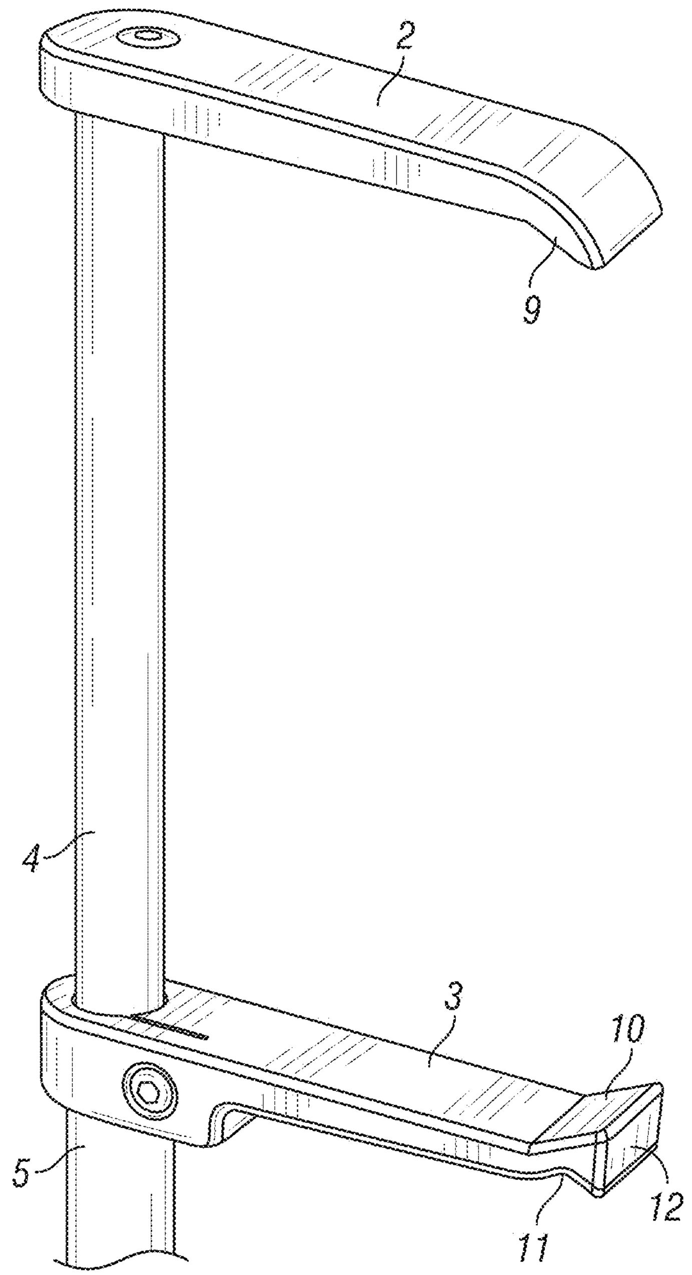
FIG. 8 is a perspective view of the gripping assembly at the distal end of the present invention shown with the gripping assembly in a third position.

FIG. 8 is a perspective view of the gripping assembly at the distal end of the present invention shown with the gripping assembly in a third position. In this figure, the top part 2 of the gripping assembly has been moved away from the bottom part 3 by sliding the inner tubular member 4 inside of the outer tubular member 5. To accomplish this, the user would push the handle 6 toward the handle 7 (see FIG. 2 for reference).

Figure 9:
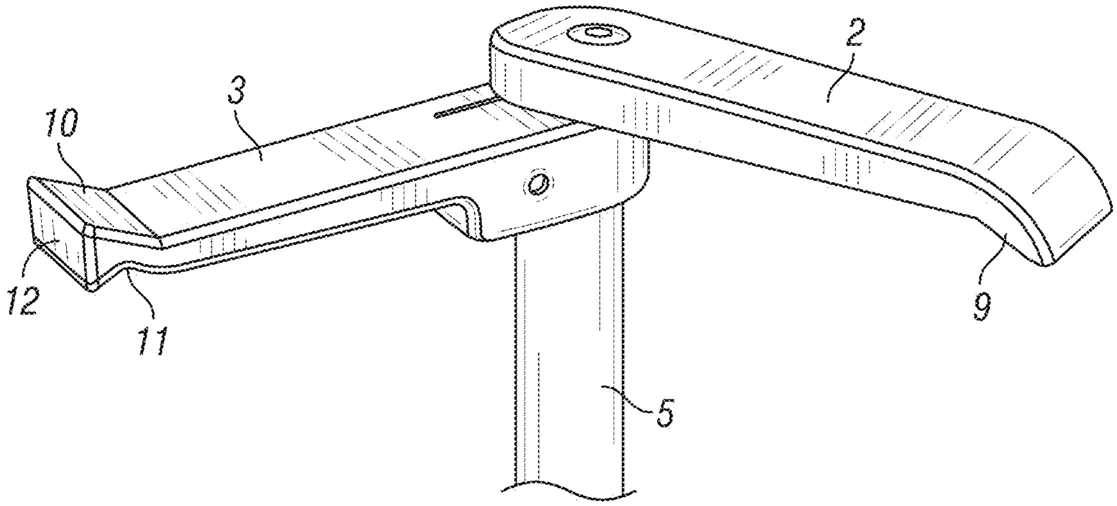
FIG. 9 is a perspective view of the gripping assembly at the distal end of the present invention shown with the gripping assembly in a fourth position.

FIG. 9 is a perspective view of the gripping assembly at the distal end of the present invention shown with the gripping assembly in a fourth position. In this position, the top and bottom parts 2, 3 of the invention are oriented similarly to the position shown in FIG. 3, except that the top part 2 has been pulled closer to the bottom part 3 so that the two parts together form an inverted "V." In this position, the gripping assembly can be used to pull larger items forward as opposed to grasping an item between the top and bottom parts. The indentation 11 acts as a hook against the item when the gripping assembly 1 is in this configuration.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A telescoping device for grasping and retrieving items comprising:
- (a) an outer tubular member;
- (b) an inner tubular member that is configured to slide telescopically and to rotate circumferentially within the outer tubular member; and
- (c) a gripping assembly that is disposed on a distal end of the telescoping device;
  - wherein the gripping assembly comprises:
    - a top part with a first end that is fixedly attached to a top end of the inner tubular member; and
    - a bottom part with a first end that is fixedly attached to a top end of the outer tubular member:
  - wherein the top part comprises a second end that is curved downward toward the bottom part;
  - wherein the bottom part comprises a second end that comprises a ramp that angles upwardly toward the top part, an indentation that is situated directly underneath the ramp on a bottom surface of the bottom part, and a flat outward-facing surface that is situated between the ramp and the indentation, the flat outward-facing surface being perpendicular to the longitudinal axis of the bottom part and parallel to the longitudinal axis of the outer tubular member;
  - wherein the bottom part further comprises an aperture that is configured to receive the top end of the outer tubular member;
  - wherein the bottom part further comprises a compression slot that extends from the aperture in the bottom part and is parallel to the longitudinal axis of the bottom part; and
  - wherein the bottom part further comprises a hole in a side wall of the bottom part, the hole extending through the compression slot and being configured to receive a bolt.

2. The telescoping device of claim 1, wherein the top part of the gripping assembly and the bottom part of the gripping assembly are approximately equal in length and width.

3. The telescoping device of claim 1, wherein the inner tubular member comprises a first handle situated at a bottom end of the inner tubular member; and
- wherein the outer tubular member comprises a second handle situated at a bottom end of the outer tubular member.

4. The telescoping device of claim 1, wherein the inner tubular member has a longitudinal axis, and the outer tubular member has a longitudinal axis; and
- wherein the top part of the gripping assembly has a longitudinal axis that is perpendicular to the longitudinal axis of the inner tubular member, and the bottom part of the gripping assembly has a longitudinal axis that is perpendicular to the longitudinal axis of the outer tubular member.

5. The telescoping device of claim 1, wherein the aperture in the bottom part of the gripping assembly comprises a lip around an inside circumference of the aperture, the lip being configured to abut up against the top end of the outer tubular member when the outer tubular member is inserted into the aperture.

6. The telescoping device of claim 1, wherein the bottom part of the gripping assembly comprises a proximal section with a thickness; and
- wherein the thickness of the proximal section is greater than the thickness of a remaining portion of the bottom part.

7. The telescoping device of claim 6, wherein the compression slot has a length, the proximal section has a length, and the length of the compression slot is approximately equal to the length of the proximal section of the bottom part of the gripping assembly.

8. A telescoping device for grasping and retrieving items comprising:
- (a) an outer tubular member;
- (b) an inner tubular member that is configured to slide telescopically and to rotate circumferentially within the outer tubular member; and
- (c) a gripping assembly that is disposed on a distal end of the telescoping device;
  - wherein the gripping assembly comprises:
    - a top part with a first end that is fixedly attached to a top end of the inner tubular member; and
    - a bottom part with a first end that is fixedly attached to a top end of the outer tubular member;
  - wherein the top part comprises a second end that is curved downward toward the bottom part;
  - wherein the bottom part comprises an aperture that is configured to receive the top end of the outer tubular member;
  - wherein the bottom part further comprises a compression slot that extends from the aperture in the bottom part and is parallel to the longitudinal axis of the bottom part; and
  - wherein the bottom part further comprises a hole in a side wall of the bottom part, the hole extending through the compression slot and being configured to receive a bolt.

* * * * *